US008468715B2

(12) United States Patent
Thomas, Jr. et al.

(10) Patent No.: US 8,468,715 B2
(45) Date of Patent: Jun. 25, 2013

(54) METHOD FOR DRYING WOOD PRODUCT AND PRODUCT OBTAINED THEREBY

(75) Inventors: William Anderson Thomas, Jr., Macon, MS (US); Roy Daniel Seale, Starkville, MS (US); James Michael White, Meridian, MS (US); Bobby Lyn White, Meridian, MS (US); Adam Glen Barwick, Laurel, MS (US)

(73) Assignee: Loblolly Industries, LLC, Shuqualak, MS (US)

( * ) Notice: Subject to any disclaimer, the term of this patent is extended or adjusted under 35 U.S.C. 154(b) by 682 days.

(21) Appl. No.: 12/579,332

(22) Filed: Oct. 14, 2009

(65) Prior Publication Data

US 2010/0092760 A1 Apr. 15, 2010

Related U.S. Application Data

(60) Provisional application No. 61/105,405, filed on Oct. 14, 2008.

(51) Int. Cl.
*B32B 21/04* (2006.01)

(52) U.S. Cl.
USPC ................. 34/396; 34/418; 34/423; 427/322; 427/325; 442/344; 428/532; 428/292.4

(58) Field of Classification Search
USPC ........ 427/322, 325; 428/532, 292.4; 442/344; 34/418, 423, 396
See application file for complete search history.

(56) References Cited

U.S. PATENT DOCUMENTS

| | | | | |
|---|---|---|---|---|
| 4,704,316 | A | 11/1987 | Grace | |
| 4,711,684 | A | 12/1987 | Coleman | |
| 4,711,689 | A | 12/1987 | Coleman | |
| 4,777,604 | A | 10/1988 | Robinson | |
| 4,931,355 | A * | 6/1990 | Radwanski et al. | 442/344 |
| 4,953,298 | A | 9/1990 | Carter et al. | |
| 5,161,591 | A | 11/1992 | Sealey et al. | |
| 5,279,691 | A | 1/1994 | Stickland | |
| 5,940,984 | A * | 8/1999 | Moren | 34/396 |
| 6,344,165 | B1 | 2/2002 | Coleman | |
| 6,569,540 | B1 * | 5/2003 | Preston et al. | 428/537.1 |
| 2007/0122644 | A1 * | 5/2007 | Jarck | 428/537.1 |

OTHER PUBLICATIONS

Barnes et al., Treatability of Steam-Pressed Scrim Lumber-SPSL; Proceedings One Hundred Second Annual Meeting, American Wood-Preservers' Association; Aug. 9, 2006 and Aug. 11, 2006; pp. 68-72; No. 2; Birmingham, Alabama.

Supplementary European Search Report and Opinion for European Patent Application No. 09821221.0; May 2, 2012.

Green et al.; Mechanical properties of wood;General technical report FPL; GTR-113; Wood handbook: wood as an engineering material; 1999; pp. 4.1-4.45; USDA Forest Service, Forest Products Laboratory; Madison, WI.

Search Report and Written Opinion for International Patent Application No. PCT/US2009/060727; Dec. 3, 2009.

* cited by examiner

*Primary Examiner* — Leszek Kiliman

(74) *Attorney, Agent, or Firm* — Jason A. Bernstein; Barnes & Thornburg LLP

(57) ABSTRACT

A method for forming an engineered wood product from pulpwood, comprising providing a quantity of pulpwood; crushing and scrimming the pulpwood to form a mat; drying in a first drying step the mat in a first pass dryer; applying a resin to the mat; and, drying in a second drying step the mat in a second pass dryer. The drying process controls moisture content using the rate of change between the entering and exiting airflow temperature. The resulting product has a high modulus of elasticity and modulus of rupture.

8 Claims, 2 Drawing Sheets

METHOD FOR DRYING WOOD PRODUCT AND PRODUCT OBTAINED THEREBY

CROSS-REFERENCE TO RELATED APPLICATION

This application claims benefit of U.S. provisional patent application No. 61/105,405, filed Oct. 14, 2008, entitled METHOD FOR DRYING WOOD PRODUCT AND PRODUCT OBTAINED THEREBY, and commonly assigned to the assignee of the present application, the disclosure of which is incorporated by reference in its entirety herein.

FIELD

The present disclosure relates to methods for drying engineered wood products, such as oriented strand board, plywood, scrimber, and the like.

BACKGROUND

Moisture content in wood is an important factor in a number of properties of structural engineered wood products (such as oriented strand board ("OSB"), plywood, scrimber, and the like). One property of particular interest to purchasers and users of such wood products is the modulus of elasticity ("MOE"). The MOE is a measure of the stiffness of the wood board. For short distance traversal, such as for a window, the MOE need not be as high as for a wood beam spanning, for example, a two-car garage, which beam requires greater strength and stiffness to prevent sagging over the longer distance and greater weight stress. High MOE is less important for plywood and oriented strand board than for other engineered products. "Chapter 4: Mechanical Properties of Wood," by David W. Green et al., in "Wood Handbook: Wood as an Engineering Material" (Madison, Wis. USDA Forest Service, Forest Products Laboratory, 1999, General Technical Report FPL; GTR-113: pages 4.1-4.45), provides a general discussion of wood properties.

Old growth unprocessed wood generally has a higher MOE than in new growth unprocessed wood or pulpwood. Pulpwood is commonly defined as wood that is 12-60 years of age or of a certain diameter (to be distinguished from veneer or dimension lumber). Old growth trees are rapidly vanishing as forests are depleted. New "immature" tree farms are increasing in development to provide a nearly limitless source of such wood. Such farms can grow trees at a faster rate using modern technology. However, the MOE of the immature trees is often less than the MOE of old growth trees. High MOE is desirable for use in some engineered wood products as it can withstand a higher load (i.e., is stronger), hence, the immature wood timber must be processed. Producing a product which has a high and desirable MOE has become increasingly difficult and more expensive with new growth trees. Current manufacturing processes using pulpwood are not effectively or practicably making product with an MOE of 1.5 or higher. It would be desirable to have an engineered wood product made of pulpwood with a MOE of at least 1.8.

Further, the modulus of rupture (MOR) is also an important characteristic of engineered wood products. A higher MOR is indicative of a product that is stronger.

Processing the trees into engineered products involves a number of steps. Among the steps is forming strand-like mats of crushed fibers and drying them to a target moisture content in a first drying step. Another step is then adding resin in an aqueous solution to separate strands of scrim to bind them together. After this step the billet of material is dried to a target moisture content level, typically by heating or microwaving the wood, usually under pressure. The water content in the resin is a factor in the drying step to drive off residual water. If the moisture level is driven too low in the first drying step, the wood will not adequately accept the resin and will not form a structurally sound lumber product.

Presently, an MOE of about 2.0 is considered to be ideal for applications requiring substantial stiffness and strength. Because of the shortage of old growth timber, the MOE which customers have had to accept has degraded to 1.8-1.9 in certain situations.

It would be desirable to have a process for making engineered wood products in which the MOE could be controlled during the production process. It would also be desirable to have such a process which could use pulpwood (inherently having lower MOE than old growth trees) and produce an engineered product having a high desirable MOE.

SUMMARY

Density, MOE and MOR affect strength. Heretofore, it was either not known or unappreciated that drying is the key. We have discovered that that in the first pass of drying the strand bundles, driving moisture content down to 5-6% had a large impact on the MOE of the end product. Between the first and second drying steps, resin in an aqueous solution is applied to the scrim. In order to effectively drive resin into the scrim a higher amount of water is typically used in the resin. In flakeboard and similar products, less water is needed in the resin solution because the flakes are tumbled and the surface area is greater. The resinated scrim is dried a second time to remove resin water. Most conventional processes for other types of wood products drive moisture down to about 5-6%, but such processes do not have the fiber bundle as in the wood product of the present disclosure. For scrim the resin is diluted to a greater degree so as to flood the fibers to get the resin in. The water is the carrier for the resin; therefore, this water gets back in the wood. Processes for making other engineered wood products do not need a second drying pass as the resination process does not add an appreciable amount of water. In the process used in the present disclosure, a second drying pass is used to remove the water. The result of the second drying pass is a higher MOE end product.

Immature wood, such as, but not limited to, pine, yellow pine, spruce, aspen, fir, yellow poplar and the like, may be used to form engineered products according to the method of the present disclosure.

The present disclosure also provides a control mechanism to determine how long the wood needs to stay in the dryer to achieve the moisture content desired. The mechanism uses the change in the delta temperature (the temperature drop) of the air temperature going into the wood versus the air temperature coming out of the wood. As the wood gets drier, the temperature difference gets less, providing one with an indication of how dry the wood is. When the change in the delta temperature is changing only about 1 degree/minute, the wood is ready to come out of the dryer.

Using the temperature drop to control moisture content is known to those skilled in the art. See, for example U.S. Pat. No. 5,940,984, the disclosure of which is incorporated by reference herein in its entirety. However, heretofore, no one has use the change in the temperature drop as the mechanism to control moisture removal.

One aspect of the present disclosure provides a method for forming an engineered wood product, comprising a) providing a quantity of pulpwood; b) crushing and scrimming the pulpwood to form a mat; c) drying in a first drying step the mat in a first pass dryer; d) applying a resin to the mat of step c); and, e) drying in a second drying step the mat in a second pass dryer.

Another aspect of the present disclosure provides an apparatus for forming an engineered wood product from pulpwood, comprising an assembly for crushing pulpwood; an assembly for scrimming pulpwood into a mat; an assembly for increasing the density of the mat; a first dryer for drying the mat; an assembly for applying a resinous material to the mat; and, a second dryer for drying the resinated mat.

Another aspect of the present disclosure provides an engineered wood product, comprising: pulpwood formed into a mat and processed to a finished wood product using two separate drying steps, between which the mat is resinated.

BRIEF DESCRIPTION OF THE DRAWINGS

The invention is illustrated in the drawings in which like reference characters designate the same or similar parts throughout the figures of which.

DETAILED DESCRIPTION

Figure 1:
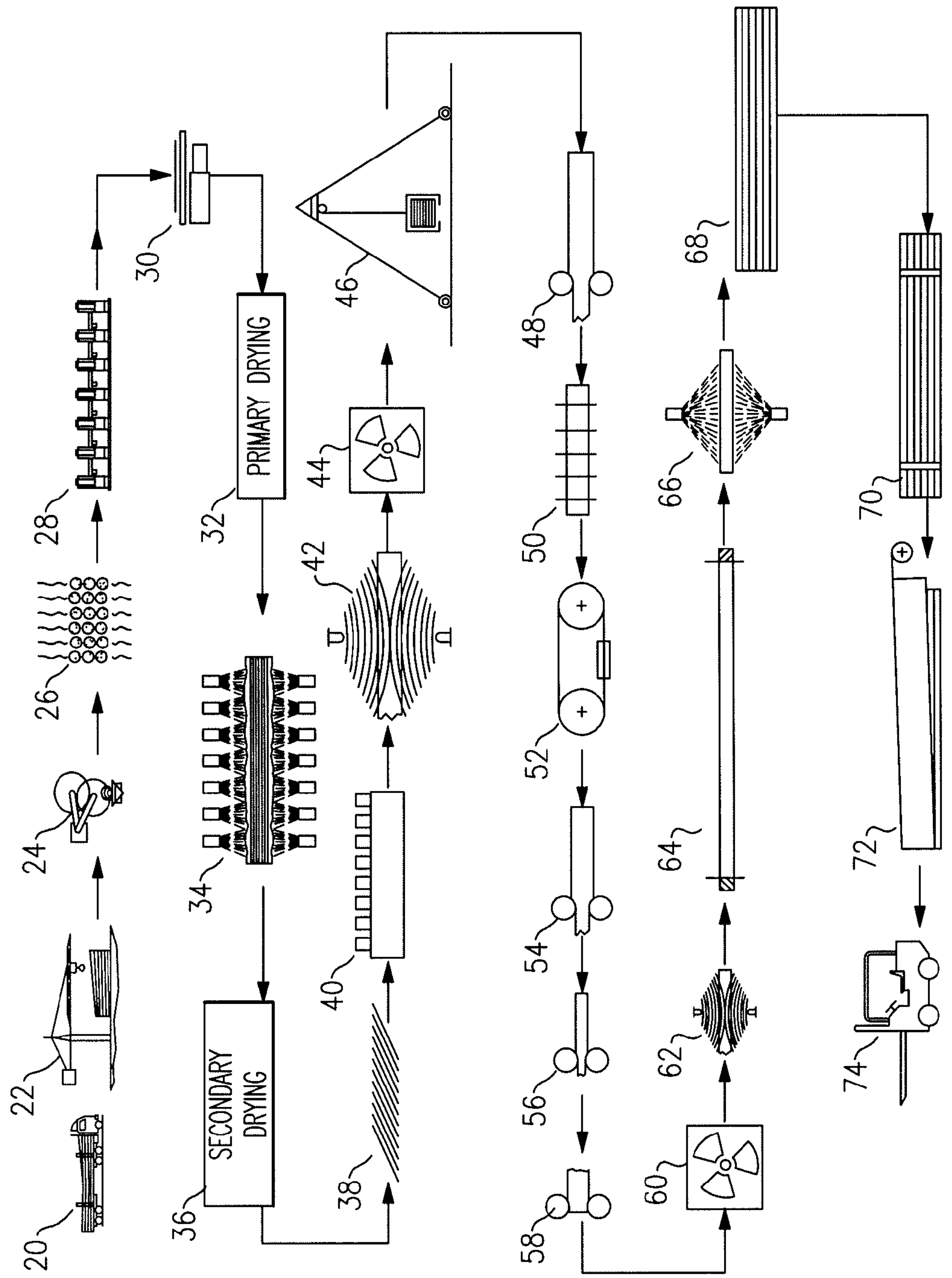
FIG. 1 is a flow diagram of a process for engineering wood products according to a first exemplary embodiment of the present disclosure.

One exemplary embodiment of a method according to the present invention is described as follows (see FIG. 1). Raw material may be obtained as follows. Round wood logs (plantation thinnings) can be purchased and delivered via contract loggers and gate wood haulers. Any suitable wood may be used. Phenol formaldehyde exterior type adhesives, as an example, but not as a limitation, may be utilized in the production process. Other adhesives, as are known to those skilled in the art, may be used.

Tree length Southern yellow pine plantation thinnings are delivered to the plant by truck (block 20).

The trucks are unloaded by a log crane (block 22) that store wood, feed the deck and control inventory age such that wood is used on first-in first-out basis when retrieving wood form the log pile.

Wood is placed on the infeed deck to the tree length log slasher and is slashed to approximately 10 foot block lengths (block 24). It is to be understood that all size measurements are used as examples and not by way of limitation. Upper and lower end limits described herein are for the purpose of describing a particular example and do not necessary reflect a firm non-exceedable number.

Oversize wood is slashed to log lengths and removed from the system for sale as saw logs or can be split into two halves utilizing band saw technology to reduce the fiber volume for the scrim line. Undersized or short logs will be hogged to produce fuel for the boiler.

Slashed blocks are then be debarked in a ring debarker to remove the bark and cambium prior to conditioning.

Blocks are conditioned to an acceptable temperature for scrimming using hot water as the heating medium (block 26). The temperature of the water will vary with season of the year, ambient temperature during the day and operating conditions in the plant. Block temperature is scanned at the scrim mills and that temperature is used as a feedback control for the water temperature.

Conditioned blocks are fed to one of the two scrim mill lines which are crushing mills that crush and separate the fiber in a proprietary process that produces wood scrim mats (block 28).

These wood scrim mats are joined together ("densified") to create a continuous mat (block 30). The edges of the mat are scarfed on an approximate 60 degree angle using opposing scarfing saws (though other angles may be used). A flying cut off saw will saw the continuous mat into 12 foot 3 inch wide by scarfed length mats that are fed to the primary dryer. It is to be understood that other mat lengths may be used.

First Pass Dry

Scrimmed mats are conveyed into the first dryer (block 32) at approximately 90% moisture (green basis). Before the present discovery of the first pass drying impact on MOE values, the target moisture content exiting the dryer was typically about 15%. Unique to the present overall process is drying the wood fiber in two drying passes, which is key to achieving high MOE values. In one exemplary embodiment of the present disclosure, targeted moisture content of the first pass is in a range of about 4%-8%. The dryer is typically made of at least one, and often several, dryer sections. The number of drying sections is related to the length of drying time used. Each section has at least one sensor proximate to the airflow infeed and at least one sensor proximate to the airflow outfeed. Several sensors can be used at each location.

The first pass dry removes sufficient moisture to enable the mat to be resinated. If too much moisture is present the resin (or glue) will not coat or adhere properly to the mat. The second pass dry (described hereinbelow) permits moisture content of the resinated mat to be controlled.

Rate of Change Delta Temperature

The control mechanism that has been developed to achieve this tight moisture content is referred to as the "Rate of Change Delta Temperature". This process utilizes temperature sensing on the fan forced air entering the scrim mat and exiting the scrim mat. The sensing is achieved by at least one temperature sensor. The "Delta Temperature" means the difference between the entering and exiting temperatures. As the Delta Temperature gets lower the moisture content in the wood is less. The Rate of Change Delta Temperature is the change in Delta Temperature over a time period. When the Delta Temperature rate of change goes below set-point for 30 seconds the scrim is at target moisture content and ready to exit the dryer. The Rate of Change Delta Temperature set-point for a single section first pass drying is 3.2 so when the Delta Temperature changes less than 3.2 degrees in 30 seconds the set-point is met. A production facility dryer can be controlled using the same theory of operation, however, it may employ multiple sensors with different set-points. In the production facility the Rate of Change Delta Temperature will be used to control the line speed through the dryer.

Glue or resin is applied to the mats exiting the primary dryer (block 34). Excess resin is removed by an air knife and any excess is immediately re-circulated into a resin pumping system and re-applied to subsequent mats.

Second Pass Dry

Resinated mats are then fed into the secondary dryer (block 36) for the second pass and dried at temperatures that are lower than the resin set temperature (for example, 230-260 degrees Fahrenheit [all temperatures stated in the present disclosure are in Fahrenheit unless otherwise noted]). The drying process is controlled by Rate of Change Delta Temperature and checked by a moisture sampling after drying. The second pass drying process works the same way as the first pass process described above except that the set-point is set at, for example, 1.14 degrees on a lab dryer with only one set-point. A dryer used in a production facility is controlled using the same theory of operation, however, it employs multiple sensors with different set-points. In the production facility the Rate of Change Delta Temperature is used to control the line speed through the dryer. On the outfeed of the production dryer there is a moisture detector to provide feedback to the process control loop.

The set point may be, for example 3.2 degrees, plus or minus 0.5 degrees. Moisture detection after drying will determine the set point before drying, which will bias the process integral derivative ("PID"). Controlling the moisture output from the dryer provides the desired MOE and MOR ranges. For a MOE of 1.8, the moisture content should be no more than about 10%; for a MOE of 2.0, the moisture content should be no more than about 8%; and, for a MOE of 2.3, the moisture content should be no more than about 6%. Prior efforts to produce such high MOE product from pulpwood would run into difficulties, such as, during the resinating step.

The MOR may be in a range of about 7,500-12,000, preferably about 7,500-11,000, and, more preferably, about 8,500-11,000.

Mats exiting the secondary dryer are split into three mats, e.g., approximately 4 feet 1 inch wide and these mats are weighed and sorted into three categories: high, on-weight and low. The high weight and low weight mats may be blended together adjacent to one another in the lay-up system along with on-weight mats so as to reduce density variation.

Dry resinated mats are then laid up in a card deck fashion (block 38) or other formation utilizing a multi-layering strategy with the number of layers determined by final target billet thickness. The card deck lay-up results in a continuous billet cross section. This continuous billet lay-up is then sawn into billets, for example, 49 feet long.

Card decked billet mats are pressed in a stem environment press (block 40) to produce billets that can range in nominal thickness from 1.75 to 7.0 inches thick by 48 inches wide and up to about 48 feet in length.

Billets exiting the press are checked for blows (block 42) and/or are X-rayed for low density spots (block 44). Billets with low density spots and/or blows are marked and processed separately from other billets. All billets are delivered (block 46) into a storage area and stacked on sticks to keep them separated for handling purposes until they are scheduled to be processed in the remanufacturing area.

Billets entering remanufacturing are touch sanded to size (block 48) prior to beginning the remanufacturing process. In the remanufacturing area, billets are first ripped to width (block 50) and are then resawn to thickness (block 52) to produce products that are rough sized and nominally 48 feet in length. These products are sorted into package lots in a sorting area and are then sanded (blocks 54, 56, 58) on all four faces and the edges are relieved to prevent edge splintering. Each product is then X-rayed anterior-to-posterior (AP) (block 60) to check for low density areas examined with a blow detector (block 62) prior to trimming to length (block 64).

After sanding, the product is trimmed to length and branded with the product logo and the quality control information identified.

A water repellant (wax or other compound) coating may optionally be applied (block 66) as a temporary weather protection during the construction process unless the product has been specifically ordered for applications that are sanded for custom finishing (show wood). The product is stacked into packages (block 68) and paper wrapped and strapped for storage and shipment (blocks 70, 72, 74).

A wood fired boiler or other steam producing apparatus may used to produce steam for the press and heat for the dryers. The plant also may include a system to collect all the residual material from the process for use as wood fuel and also pollution control devices such as RTO's (regenerative thermal oxidizers), bag filters or the like.

One exemplary embodiment of the aforementioned method may utilize the process parameters shown in Table 1.

TABLE 1

| | |
|---|---|
| Dryer Pass | 2 |
| Basket 1 | 3 |
| Basket 2 | 10 |
| Min. Cyc. | 21.00 |
| Max. Cyc. | 25.00 |
| Hot Temp | 242.2 |
| Return Temp | 226.4 |
| Delta Temp | 14.9 |
| Delta Temp Ave | 16.7 |
| Delta Change Rate SP | 1.14 |
| Delta Change Rate | 1.15 |

The MOE of product which can be made according to the present invention may be in the range of about 1.8-2.3, preferably in the range of about 2.0-2.3. The MOR may be in the range of about 7,500-12,000; preferably in the range of about 7,500-11,000; more preferably in the range of about 8,500-11,000. The MOE of product made from pulpwood according to the present invention is higher than the MOE of currently commercially available engineered product made from similar pulpwood. The result is that acceptably strong material can now be made from younger, more available, more replaceable, and lower cost wood.

Figure 2:
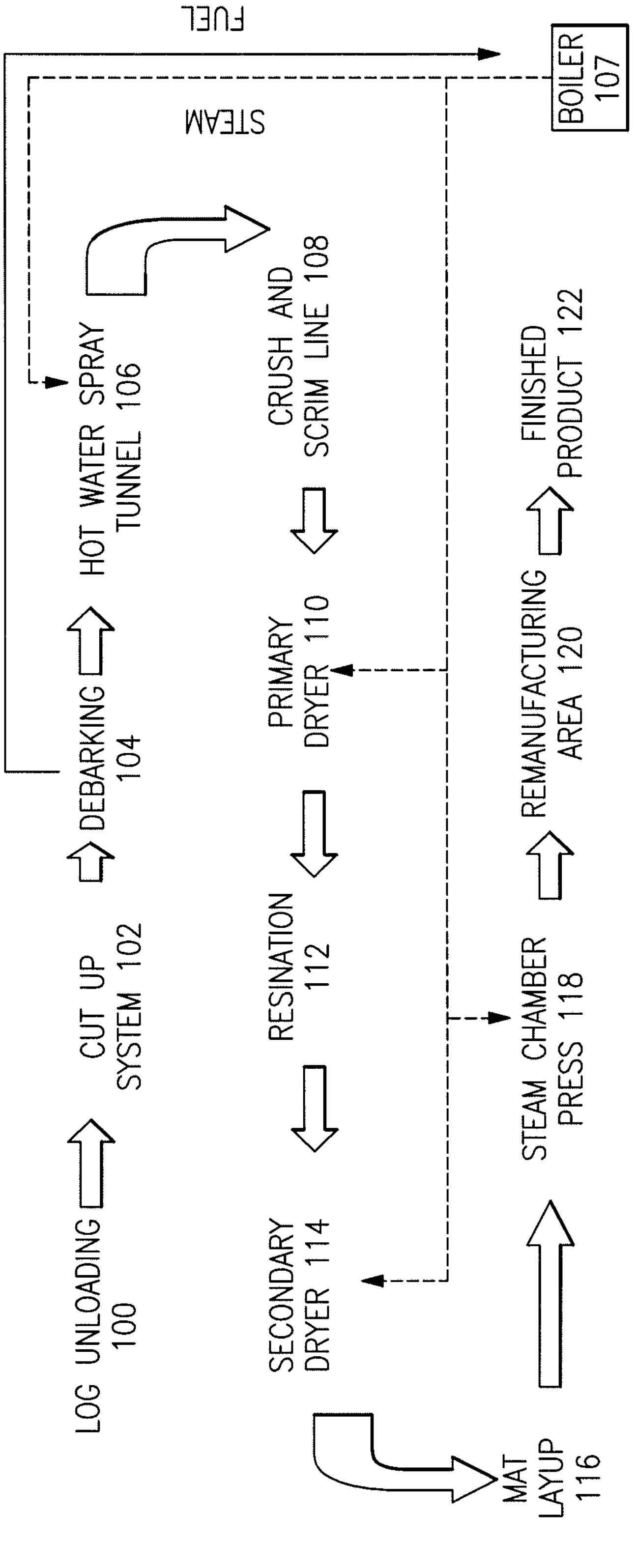
FIG. 2 is a flow diagram of a process for engineering wood products according to a second exemplary embodiment of the present disclosure

A second exemplary embodiment of a method according to the present disclosure is shown in FIG. 2. Logs are unloaded (block 100), cut as needed (block 102) and debarked (block 104). The wood is then passed through a hot water spray tunnel (block 106) into which steam (dotted line) is fed via boiler (block 107). The wood is run through the crush and scrim line (block 108). It is then conveyed into a primary (first pass) dryer (block 110). After drying, it is resinated (block 112). The resinated product is then conveyed into a secondary (second pass) dryer (block 114). The dried mat is laid up (block 116). The mat can then be pressed in a steam chamber (block 118) and conveyed to a remanufacturing area (block 120) and finished (block 122) as needed. The solid line shows the flow direction of fuel to the boiler 107 and the dotted line shows the direction of steam provided by the boiler 107.

Process Control Methods and Frequency of Process Checks

Automatic sensors and detectors are utilized in the production process. In certain key areas these sensors can signal to stop production or downgrade product to achieve the overall quality target of shipping 100% on-grade product.

The log crane operator can manage log inventory utilizing a first-in first-out strategy. The rotation and volume of logs under the crane can be checked on each shift and documented by the operator.

Block length can be checked periodically, e.g., once per shift, by measuring the block with a tape measure.

Each block diameter can be scanned and written into an electronic database. The decision to run, reject, or split the block is recorded into the database. Logs that are selected for splitting can be split using a band saw.

Log temperature can be constantly monitored to produce a high quality scrim. If the block temperature is not within the specifications associated with best (or preferred) manufacturing practices, production can be suspended until the problem is corrected.

The block heating system (steam tunnel) can have water temperature and flow sensors at a number of locations along the tunnel and can be monitored constantly by a PLC. If the water temperature or water flow is not within the best manufacturing practices guidelines, an alarm can be written to the operator console and the electronic database.

When scrim exits the scrim line it can be weighed and optically scanned for area. The mat can be adjusted to a specified weight per square foot according to the best manufacturing practices. The weight and area of each mat can be written into a database.

Once a mat has been adjusted for weight and trimmed for length and width, the width of the scrim mats can be checked once a shift with a tape measure and the data recorded and entered into the quality database.

Each mat can be automatically weighted before entering the first dryer and the weight recorded into an electronic database.

Dryer processing parameters can be constantly monitored by a PLC and adjustments to the dryer can be made according to air temperature differentials to achieve mat moisture consistent with best manufacturing practices for the first drying operation.

After exiting the first dryer each mat can be automatically weighed and written into an electronic database.

Resin solution will be flooded over the scrim mats and excess solution can be filtered and recycled. Resin flow is constantly monitored and if the flow becomes impaired the production line can automatically stop until the problem is corrected. The event that stopped the line can be logged into an electronic database.

After glue application, each mat is automatically weighted and the weight written into an electronic database.

Wet resinated mats are dried in the final dryer can be constantly monitored by a PLC. Adjustments to the dryer can be made according to the temperature differentials to achieve mat moisture consistent with best manufacturing practices for the second drying operation.

After exiting the final drying operation each mat is split into three smaller mats, such as, 4.1 inches wide. Each 4.1 inch mat is weighted and sorted into trays for below average, average, and above average based on final dry weight.

After final drying either an inline moisture detector can periodically record moisture content for each mat or a moisture sample can be collected periodically, e.g., every 2 hours, and manually dried in an oven and calculated moisture can be obtained.

The number of weigh operations from scrimming to exit of the final dryer allows for calculation of initial weight, final weight, resin solids applied, and water applied and removed for each mat at each step of the process. If moisture or applied resin is out of best manufacturing practice targets, the PLC control systems can be modified to correct the problem. Mats that are out of specification for final weight, moisture content, or resin content can be discarded.

Once a billet has been assembled from individual layers on the weight trays, the billet is automatically weighed before and after pressing to determine change in weight due to pressing.

The press cycle of each billet can be monitored. Target parameters listed in the best manufacturing practices should be met or the billet can be placed in a quality testing required queue. Target parameters include time from load to press closure, attaining target press pressures and resultant calculated steam temperature.

Overall billet density for each billet can be calculated based on weight and dimensions after pressing. Billets with low bulk densities can be marked as low density billets and processed as columns in the remanufacturing operation.

After pressing, each billet can be checked with a blow detector. Billets positively identified by the blow detector can be marked with paint and stored in an area for reprocessing as column product.

After pressing, each billet can be checked for low density areas by an X-ray inspection device and associated software. Billets with low density areas can be marked with paint and stored in an area for reprocessing as column product.

Billets entering the remanufacturing area can be sawn to a rough size and sanded to final dimensions.

After billets are reduced to marketable sizes, each piece can be sanded and subsequently X-rayed through AP (anterior to posterior—through the wide face) to check for low density areas. Boards with low density areas can be classified as off grade product and sent to the chipper for recovery as boiler fuel.

After billets are reduced to marketable sized, each piece can be sanded and subsequently checked with a blow detector. Product identified as having blow defects can be classified as off grade product and sent to the chipper for recovery as boiler fuel.

Billets marked behind the press with paint as having low density areas or blows can be sawn into column sizes. Once reduced to column sizes they can be scanned once again by the blow detector for blows and the X-ray system for low density areas. Columns found to exhibit either defect can be sent to the chipper for recovery as boiler fuel. Products that pass both tests can be marked as on grade.

All product must pass the blow detector and X-ray scan to be on grade. Product that does not pass both tests is considered to have major defects.

Once product is reduced to final size and has passed the blow detector and X-ray system, it may be finish sanded and sold as architectural grade. Billets that exhibit torn face grain would have minor defects that render them unacceptable for architectural grade but acceptable for structural applications.

The present disclosure provides a method for forming engineered wood product by the process described hereinabove. The present disclosure also provides an engineered wood product produced by the process described hereinabove and having a high MOE. The present disclosure further provides an engineered wood product having a high MOE which is formed from pulpwood.

In another exemplary embodiment, the present disclosure provides an apparatus for forming an engineered wood product from pulpwood comprising an assembly for crushing pulpwood; an assembly for scrimming pulpwood into a mat; an assembly for increasing the density of the mat; a first dryer for drying the mat; an assembly for applying a resinous material to the mat; and, a second dryer for drying the resinated mat.

All patents, patent applications and publications referred to herein are incorporated by reference in their entirety.

The invention claimed is:

1. A method for forming an engineered wood product, comprising:

a. providing a quantity of pulpwood;

b. crushing and scrimming the pulpwood to form a mat;

c. drying the mat in a first drying step in a first pass dryer;

d. measuring the drop in the temperature ("delta temperature" or "ΔT") sensed on air entering a scrim mat compared to the air exiting the scrim mat, wherein the change in ΔT over a time period defines a rate of change of the delta temperature ("dΔT/dt");

e. removing the mat from the first pass dryer when the rate of change of the delta temperature (dΔT/dt) for the first pass drying step is less than about 3.2 degrees F. in about 30 seconds;

f. applying a resin to the mat of step d;

g. drying the mat in a second drying step in a second pass dryer;

h. measuring the change in the air temperature going into the mat and the air temperature coming out of the mat in the second pass dryer; and, i. removing the mat from the second pass dryer when the air temperature change reaches a set-point of about 3.2 degrees F. (plus or minus 0.5 degrees F.) per minute.

2. The method of claim 1, further comprising, after said second pass drying, forming a finished wood product.

3. The method of claim 1, wherein the line speed of the scrim through the dryer is controlled in response to the rate of change delta temperature dΔT/dt.

4. The method of claim 1, wherein the engineered wood product thus formed has a modulus of elasticity in a range of about 1.8-2.3.

5. The method of claim 1, wherein the engineered wood product thus formed has a modulus of rupture in a range of about 7,500-12,000.

6. A method of drying wood or wood components, comprising:

a. placing a quantity of wood in a first pass dryer;

b. drying the wood in a first drying step;

c. measuring the drop in the temperature ("delta temperature" or "ΔT") sensed on air entering the wood or wood components compared to the air exiting the wood or wood components, wherein the change in ΔT over a time period defines a rate of change of the delta temperature ("dΔT/dt"); and, d. removing the mat from the first pass dryer when the rate of change of the delta temperature (dΔT/dt) for the first pass drying step is less than about 3.2 degrees F. in about 30 seconds.

7. The method of claim 6, further comprising a step e., applying a resin to the wood or wood components dried in step d.

8. The method of claim 7, further comprising the steps of f. drying the wood or wood components of step e. in a second drying step in a second pass dryer;

g. measuring the change in the air temperature going into the wood or wood components and the air temperature coming out of the wood or wood components in the second pass dryer; and, h. removing the wood or wood components from the second pass dryer when the air temperature change reaches a set-point of about 3.2 degrees F. (plus or minus 0.5degrees F.) per minute.

* * * * *